United States Patent [19]
Murchison

[11] 3,844,914
[45] Oct. 29, 1974

[54] PHOTOLYTIC PURIFICATION OF AQUEOUS SOLUTIONS CONTAINING NITROPHENOL COMPOUNDS

[75] Inventor: Craig B. Murchison, Midland, Mich.

[73] Assignee: The Dow Chemical Company, Midland, Mich.

[22] Filed: Sept. 4, 1973

[21] Appl. No.: 394,010

[52] U.S. Cl. .................. 204/158 R, 204/157.1 R
[51] Int. Cl. ............................................ B01j 1/10
[58] Field of Search ............... 204/158 R, 157.1 R

[56] References Cited
UNITED STATES PATENTS
3,620,944   11/1971   Tanito et al. .................. 204/158 HE Primary Examiner—Howard S. Williams
Attorney, Agent, or Firm—Stephen R. Wright

[57] ABSTRACT

Aqueous solutions contaminated with low concentrations of nitrophenol compounds such as 4,6-dinitro-ortho-secondary-butyl phenol and/or ortho-secondary-butyl-4-nitro-phenol-6- sulfonic acid are photolytically treated by exposure to ultraviolet light, and oxygen, at a pH of about 3.5 or less to reduce the quantity of said compounds in the aqueous solution without the formation of undesirable gummy residues.

16 Claims, 1 Drawing Figure

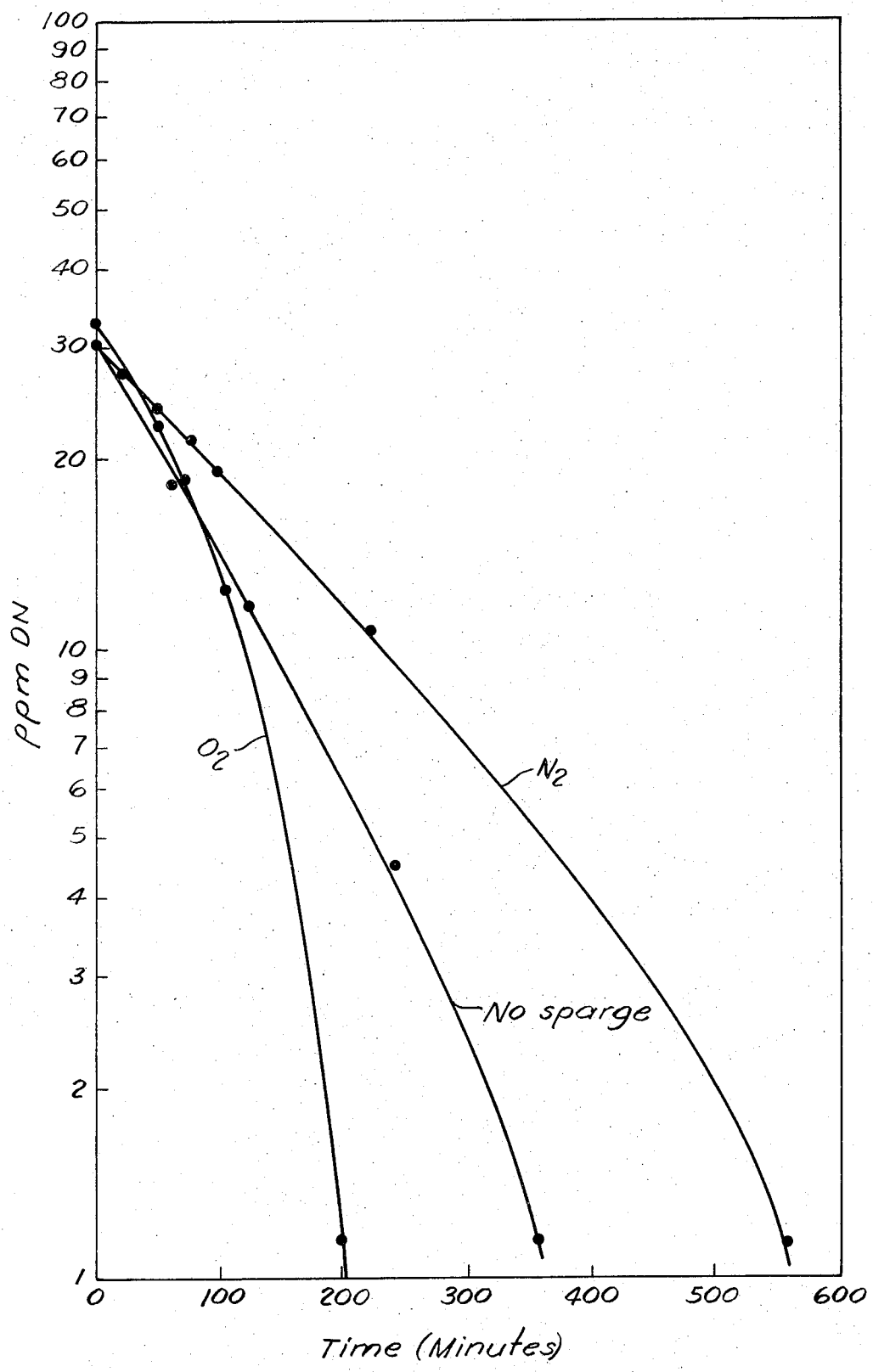

PHOTOLYTIC PURIFICATION OF AQUEOUS SOLUTIONS CONTAINING NITROPHENOL COMPOUNDS

BACKGROUND OF THE INVENTION

Broadly, the invention relates to the purification of aqueous solutions containing certain organic contaminants. Specifically, the invention pertains to a photolytic method of substantially eliminating small concentrations of nitrophenol compounds such as 4,6-dinitro-ortho-secondary-butyl phenol (DN) and ortho-secondary-butyl-4-nitrophenol-6-sulfonic acid (NS).

Among the organic impurities found in industrial liquids, DN and NS are particularly troublesome. Not only do these compounds color the aqueous solution but they are also toxic to fish even when the compounds are only present in minute concentrations, i.e., 1-5 ppm., and also they are toxic to those microorganisms which are utilized to decompose organic compounds in biological waste treatment processes, rendering such processes unusable in treating DN and NS contaminated solutions.

Although DN and NS can be decomposed by chemical oxidation processes, such processes generally involve either the use of elevated temperatures which require special reaction equipment and high amounts of energy or the introduction of oxidizing agents which are reduced into species which must themselves be removed from the treated solution.

Although many organic species can be decomposed by ultraviolet irradiation (with and without the aid of oxidizers such as $O_2$, $Cl_2$, and the like), in general phenolics have been found to photolyze into objectionable dark colored solutions which often contain solid, gummy products which are difficult to dispose of. For example, it is pointed out by J. L. R. Williams and P. J. Grisdale in "Chemistry and Industry," 1968, pp. 1,477-1,479, that insoluble products are often formed from photochemical reactions in general. The authors note that when a source rich in radiation of wavelength 2537A is used, side reactions often occur to form "polymers" which appear as coatings on the surface of the radiation source.

Surprisingly it has now been discovered that DN and NS can be decomposed in an aqueous solution employing irradiation without the formation of these undesirable byproducts.

SUMMARY OF THE INVENTION

An aqueous solution containing a nitro-phenol compound, such as DN or NS, is acidified to a pH of about 3.5 or less and irradiated by an ultraviolet light source emitting energy of wavelength in the range of about 2,000 to 3,000 Angstroms. The DN and NS are decomposed to form generally water soluble products which are acceptable for discharge into public waters. The decomposition process is accelerated by sparging oxygen into the aqueous solution. The process may be carried out either continuously or in batch. A clarification step is desirably employed after the acidification step, to remove the precipitate formed upon acidification of a solution containing more than about 30 ppm. DN and/or NS.

DESCRIPTION OF THE DRAWING

The FIGURE illustrates in graphical form the data generated in Example 4.

DETAILED DESCRIPTION OF THE INVENTION

Although solutions containing virtually any nitrophenol compound are successfully treated by the method of the present invention, those solutions containing DN and/or NS are particularly beneficially treated. In the present discussion references to DN and/or NS will be understood to refer as well to the nitrophenol class in general.

The aqueous solutions treated by the method of this invention may contain any concentration of the nitrophenol compound, e.g., DN or NS, although the particular utility of this method is its economy in treating low concentrations, e.g., less than about 100 ppm. (parts per million). Certain other organic impurities, if present, may be decomposed by this method; but the present invention pertains to the degradation of DN and/or NS without the formation of undesirable gummy residues.

The aqueous solution is desirably first acidified to a pH of 3.5 or less. It is found that acidification causes DN and/or NS to absorb a greater portion of the more photolytically active radiations, e.g., the ultraviolet rays. Further acidification to pH values of less than 3.5 is found to only slightly improve the efficiency of the reaction. The aqueous solution may be acidified by the addition of an acid such as HCl, or by other means which do not adversely affect the u.v. absorption capabilities of the organic impurities present in the liquid.

If DN or NS are present in concentrations in excess of about 30 ppm. acidification may cause certain amounts of these compounds to precipitate in their original forms, i.e., as DN or NS. The precipitate may be removed from the aqueous solution prior to irradiation, e.g., by passing the solution through a set of clarifiers, or the precipitate may be left in the solution. The precipitate will dissolve and be decomposed by the present method of treatment as the soluble DN and NS are decomposed. It is considered more economical, however, to remove the precipitates prior to the irradiation step. The remaining solution, containing about 30 ppm. of DN or NS, is then treated according to the present method to further reduce the concentration of DN and/or NS.

Oxygen in gaseous form is preferably brought into contact with the acidified aqueous solution, preferably in sufficient quantity to saturate the solution. Sparging the solution with air is one example of many possible gas-liquid contacting techniques which are suitable for this purpose. Although the presence of oxygen is not necessary, it is desired because it increases the rate of decomposition of DN and NS.

The temperature of the aqueous solution is not critical in the practice of the present invention; photolysis rates are not significantly influenced by reaction zone temperatures. Accordingly the solution is ordinarily treated at the temperature at which it is received, e.g., about 25°C. However, the aqueous solution must not be frozen, and high temperatures are ordinarily avoided due to their adverse effect on $O_2$ solubility in the solution.

The acidified and preferably oxygenated aqueous solution is exposed to u.v. radiation, preferably in the wavelength range of about 2,000 to about 3,000 Angstroms. It has been found that light of wavelength greater than 3,000 Angstroms is of little effect in promoting the decomposition of the DN and/or NS compounds. Thus the use of natural sunlight is generally not feasible in the practice of the present invention since only a small portion of its radiation has a wavelength of less than 3,000 Angstroms. Radiation below about 2,000 Angstroms is not generally useful because water, oxygen and HCl all absorb u.v. radiation of such wavelengths. The aqueous solution is exposed to the u.v. radiation for a sufficient period of time to decompose the DN and NS constituents to the extent desired.

An appropriate source of u.v. radiation is a low or medium pressure mercury arc lamp, e.g., a Hanovia lamp, such as used in the working Examples set forth hereinafter. Higher power irradiation sources permit the attainment of higher rates of purification.

The amount of energy required in the present method is found to vary depending on the source of the radiation and on the nature of those contaminants, if any, present in addition to DN and/or NS. A representative range, for example, is from about 200 to about 560 kw-hr per pound of DN or NS decomposed.

The vessel in which the irradiation is carried out must permit the entry of u.v. radiation without significant energy loss. The u.v. radiation source can be suspended above the aqueous solution to be treated such as in a closed reactor vessel or, alternatively, the u.v. radiation source may be suspened in a well which is transparent to the u.v. radiation, e.g., a quartz cell, and is immersed in the liquid.

The present invention may be practiced as a batch process or as a continuous flow process. In a continuous flow process a flowing stream of an aqueous DN and/or NS solution is acidified, oxygenated, and then irradiated. As an intermediate step the liquid may be passed through a clarification means after it has been acidified to remove precipitated forms of DN and/or NS and then treated as defined hereinbefore.

By practicing the method of the present invention the concentration of DN and/or NS present in the aqueous solution may be reduced to levels, e.g., 1 ppm or less, low enough that the solution may be discharged into public waters or otherwise reused. If other organic impurities remain, not having been sufficiently decomposed by the present process, the solution may be treated in a conventional waste treatment plant, e.g., by microorganisms, and then discharged into public waters or otherwise reused.

EXAMPLE 1

A 2 liter pyrex resin flask was equipped with a quartz light well which gave an optical path length of about 5.6 cm. Into the light well was placed a Hanovia 100 watt medium pressure lamp. A magnetic stirrer was placed in the flask to effect mixing of the solution. DN (0.0332 gram) was dissolved in 1,800 ml. of $H_2O$. The pH of this solution was adjusted to 2 by the addition of HCl. $O_2$ was sparged into the solution through a fritted glass sparge. The u.v. absorption of the solution was measured with a Perkin-Elmer Model 202 ultraviolet visible spectrophotometer. The wavelength band between 1900 Angstroms and about 3,950 Angstroms was scanned at the outset of the run, after 61 minutes and after 160 minutes. Peaks are found to occur in the absorbance spectrum at particular wavelengths; these wavelengths are indicative of a particular organic species in the solution. Based on Beer's law, the ratio of the height of an absorbance peak at a point in time to the initial height of the peak represents that fraction of the original concentration of the species which remains non-degraded. In this experiment the DN peaks were measured and compared as a function of time to permit calculation of the percentage of DN decomposed as a function of time. Table I shows the percent DN decomposed over the time period of 160 minutes.

Table I

| Time (min.) | DN u.v. Absorbance | Calculated % DN Removed | Calculated PPM DN Remaining |
|---|---|---|---|
| 0 | 0.97 | 0 | 18.5 |
| 61 | 0.48 | 49.5 | 9.5 |
| 160 | 0.10 | 89.5 | 2.0 |

EXAMPLE 2

The same procedure employed in Example 1 was repeated employing 0.040 gram of NS dissolved in 1,800 ml. of $H_2O$. The optical path length was 5.5 cm. All other parameters remained the same, and the absorbance scan was obtained by the same method employed in Example 1. The removal of NS obtained was determined by the same method used in Example 1 and is shown in Table II.

Table II

| Time (min) | NS u.v. Absorbance | Calculated % NS Removed | Calculated PPM NS Remaining |
|---|---|---|---|
| 0 | 0.365 | 0 | 22.2 |
| 60 | 0.13 | 64.5 | 7.9 |
| 120 | 0.024 | 93.5 | 1.4 |

EXAMPLE 3

In this example the effect of pH on the photodegradation of certain organic species was determined utilizing the apparatus and technique of Example 1. Herein an actual waste solution, containing other contaminants in addition to DN, was utilized. The pH in successive trials was adjusted by additions of HCl or NaOH as required. This example shows that faster reaction rates are obtained at acidic pH values, with the rates attainable reaching a plateau at pH values of about 3.3 and below. The results obtained are presented in Table III.

Table III

| Trial No. | pH | Initial Conc. DN (ppm) | Final Conc. DN (ppm) | Time (min.) | Calculated Rate of Decomposition DN (mg/min) |
|---|---|---|---|---|---|
| 1 | 2.5 | 30 | 4.5 | 241 | .19 |
| 2 | 3.3 | 30 | 4.5 | 241 | .19 |
| 3 | 5.5 | 28 | 11.0 | 386 | 0.079 |
| 4 | 8.5 | 30 | 19 | 392 | 0.050 |

EXAMPLE 4

In this example the effect on the decomposition of DN contained in an aqueous solution of sparging the solution with $O_2$, $N_2$, or not sparging was determined. Three samples of DN-containing waste solutions were obtained from a process effluent stream. Each sample was tested by the method and apparatus used in Example 1. The optical path length was 5.5 cm. and the starting concentration of DN was about 30–34 ppm. The concentration of DN present at any time was calculated from readings obtained on an UV–VIS spectrophotometer. The disappearance of DN was followed from starting concentrations of about 30 ppm. down to final concentrations, chosen only for purposes of this test and not indicative of a process limit, of about 1.3 ppm. The relative rates of disappearance of DN are shown in the curves presented in the FIGURE. As the data demonstrates, sparging with $O_2$ results in reducing the concentration of DN to about 1.3 ppm. in about 72 percent less time than with a sparge of $N_2$, and in about 23 percent less time than if no sparge was utilized.

EXAMPLE 5

In this example the effect of the wavelength of u.v. irradiation on the reaction rate was determined. The same procedure was used as in Example 1, except that the pH in these tests was 2.5, the initial concentration of DN was 33 ppm., and different light wells were used in the two trials. In the first test, a quartz well was used, permitting essentially all of the radiation of wavelength ranging from about 2,000 to 3,000 and greater Angstroms to pass into the DN solution. In the second test, a pyrex well was used, which allowed only radiation of wavelength greater than about 3,000 Angstroms to pass into the aqueous solutions. The results of these tests are set forth in Table IV. It is seen that wavelengths greater than about 3,000 Angstroms are much less effective for photolysis than wavelengths between about 2,000 and 3,000 Angstroms.

Table IV

| Trial No | Well Material | Wavelength of Radiation Passed | Initial Concentration DN (ppm.) | Final Concentration DN (ppm.) | Time (min.) | Calculated Rate of Decomposition DN (mg/min.) |
|---|---|---|---|---|---|---|
| 1 | quartz | >2000 Angstroms | 33. | 1.5 | 200 | 0.312 |
| 2 | pyrex | >3000 Angstroms | 33. | 29.9 | 200 | 0.027 |

EXAMPLE 6

In this example certain other phenols were treated according to the practice of the present invention. According to the same procedure utilized in Example 1, phenol, p-chloro-phenol, and p-nitrophenol were tested. In each test the sample solution contained about 100 ppm. of the species tested. The u.v. absorbance of the byproduct (if any) formed was scanned at 3,500 Angstroms, except in the case of p-nitrophenol in an alkaline medium, wherein the scan was conducted at 5,000 Angstroms. Qualitative color observations were also made. The results of these tests are set forth in Table V.

It is seen that whereas a phenol solution becomes increasingly dark and more absorbant of u.v. radiation (indicating the generation of aromatic byproducts), a p-nitrophenol solution becomes less colored and less absorbant of u.v. radiation, (indicating the disappearance of the nitrophenol species). The chlorophenol species begins to disappear after a substantial period of time, after having initially formed a very dark byproduct.

Table V

| Trial No. | Species | pH | Time (min.) | Byproduct Species u.v. Absorbance | Color Observation |
|---|---|---|---|---|---|
| 1 | phenol | 3–4 | 0 | 0.00 | became |
|   |   |   | 37 | 0.08 | increasingly |
|   |   |   | 173 | 0.22 | brown |
|   |   |   | 400 | 0.38 |   |
|   |   |   | 1370 | 0.72 |   |
| 2 | phenol | 8–9 | 0 | 0.00 | became |
|   |   |   | 60 | 0.18 | increasingly |
|   |   |   | 140 | 0.33 | brown |
|   |   |   | 1025 | 1.08 |   |
| 3 | p-chlorophenol | 3–4 | 0 | 0.00 | became rapidly |
|   |   |   | 37 | 0.60 | dark brown, |
|   |   |   | 173 | 0.79 | this color |
|   |   |   | 400 | 0.89 | increasing |
|   |   |   | 1375 | 0.28 | with time; color began to decrease at ≈ 1000 min. |
| 4 | p-chlorophenol | 8–9 | 0 | 0.00 | became rapidly |
|   |   |   | 60 | 0.75 | dark brown, |
|   |   |   | 140 | 0.85 | this color |
|   |   |   | 1025 | 0.63 | increasing with time; color began to decrease at ≈ 1000 min. |
| 5 | p-nitrophenol | 3–4 | 0 | 4.5 | became |
|   |   |   | 37 | 4.5 | decreasingly |
|   |   |   | 173 | 4.0 | yellow |
|   |   |   | 400 | 3.4 |   |
|   |   |   | 1375 | 0.2 |   |
| 6 | p-nitrophenol | 8–9 | 0 | 0.1 | became |
|   |   |   | 60 | 0.2 | increasingly |
|   |   |   | 140 | 0.3 | red |
|   |   |   | 1025 | 1.0 |   |

What is claimed is:

1. A method of treating an aqueous solution containing a nitrophenol compound to decompose said compound comprising:

irradiating the aqueous solution at a pH of about 3.5 or less with ultraviolet radiation of sufficiently short wavelength for a sufficient period of time to decompose substantially all of said compound.

2. The method of claim 1 wherein the nitrophenol compound is selected from the group consisting of 4,6-dinitro-ortho-secondary-butyl phenol (DN) and ortho-secondary-butyl-4-nitrophenol-6-sulfonic acid (NS).

3. The method of claim 1 wherein the nitrophenol compound is 4,6-dinitro-ortho-secondary-butyl phenol (DN).

4. The method of claim 1 wherein the nitrophenol compound is ortho-secondary-butyl-4-nitrophenol-6-sulfonic acid (NS).

5. The method of claim 1 wherein the nitrophenol compound is p-nitrophenol.

6. The method of claim 1 wherein the aqueous solution is saturated with oxygen during the irradiation thereof.

7. The method of claim 1 wherein the ultraviolet radiation has a wavelength of from about 2,000 to about 3,000 Angstrom units.

8. The method of claim 1 wherein the irradiation is continued for a period of time sufficient to deliver about 560 kw-hr of energy per pound of said compound present therein.

9. The method of claim 1 wherein the pH of the aqueous liquid is about 3.5.

10. A method of treating an aqueous solution containing greater than about 30 ppm. of a nitrophenol compound to decompose said compound comprising:

a. acidifying the aqueous solution to a pH of about 3.5 or less, to precipitate a portion of said compound;
   b. removing a substantial portion of said precipitated compound from said aqueous solution;
   c. contacting said aqueous solution with oxygen, and
   d. irradiating said aqueous solution with ultraviolet radiation of sufficiently short wavelength for a sufficient period of time to decompose substantially all of said compound remaining in the solution.

11. The method of claim 10 wherein the nitrophenol compound is selected from the group consisting of 4,6-dinitro-ortho-secondary-butyl phenol (DN) and ortho-secondary-butyl-4-nitrophenol-6-sulfonic acid (NS).

12. The method of claim 10 wherein the nitrophenol compound is 4,6-dinitro-ortho-secondary-butyl phenol (DN).

13. The method of claim 10 wherein the nitrophenol compound is ortho-secondary-butyl-4-nitrophenol-6-sulfonic acid (NS).

14. The method of claim 10 wherein the nitrophenol compound is p-nitrophenol.

15. The method of claim 10 wherein the ultraviolet radiation has a wavelengthh of about 2,000 to about 3,000 Angstrom units.

16. The method of claim 10 wherein the aqueous solution is acidified with HCl.

* * * * *